Oct. 29, 1957  W. M. BREADY  2,811,336
HEAT EXCHANGE APPARATUS FOR LIQUIDS CONTAINING SOLIDS
Original Filed Nov. 4, 1949

INVENTOR.
WILLIAM M. BREADY
BY
Wheeler, Wheeler & Wheeler
ATTORNEYS

United States Patent Office 2,811,336
Patented Oct. 29, 1957

2,811,336

HEAT EXCHANGE APPARATUS FOR LIQUIDS CONTAINING SOLIDS

William M. Bready, Milwaukee, Wis.

Original application November 4, 1949, Serial No. 125,442, now Patent No. 2,651,508, dated September 8, 1953. Divided and this application July 3, 1953, Serial No. 365,819

10 Claims. (Cl. 257—234)

This invention relates generally to heat exchange method and apparatus for liquids containing solids and particularly to a special adaptation of this apparatus for distillery usage. This application is a division of my co-pending patent application Serial No. 125,442, filed November 4, 1949, and entitled Heat Exchange Apparatus for Liquids Containing Solids, now Patent 2,651,508, granted September 8, 1953.

In addition to the objects of the invention stated in my co-pending application aforesaid, it is an object of the invention claimed in this division application to provide in a distillery operation novel apparatus and method for mixing slop with mash before the mash is cooled and desirably after the slop is partially cooled. In the apparatus herein disclosed I am able to achieve positive control of the proportions of the mixture, reduction of the time required to cool both the slop and the mash, and reduction in the pumping pressure otherwise required. These objects are achieved under conditions of high efficiency of heat transfer, high velocity of liquid flow through parallel tubes of small cross section, without clogging the apparatus with solids entrained in the liquid.

Figure 2:
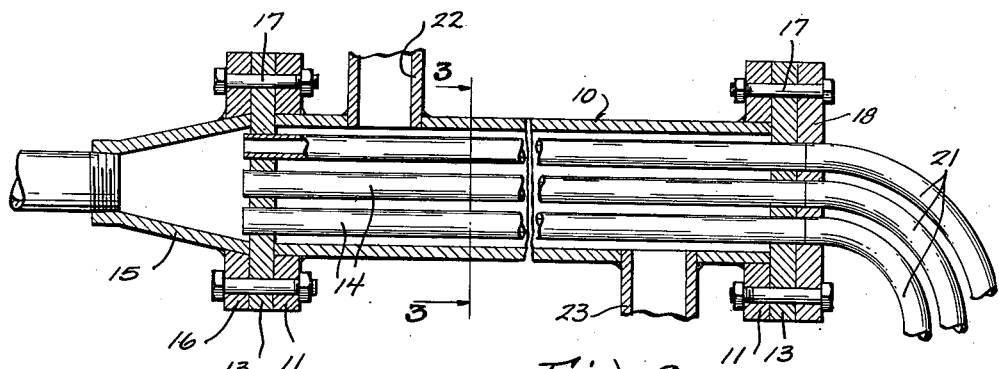
Fig. 2 is an axial cross section through one of the heat exchange jackets of the device shown in Fig. 1, the multiple tubes within the jacket being shown partly in cross section and partly in elevation.
Figure 3:
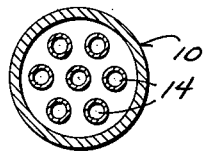
Fig. 3 is a cross sectional view taken along the line 3—3 of Fig. 2.

As in my co-pending application aforesaid, and as best shown in Fig. 2 herein, each heat exchange jacket 10 is provided with end flanges 11, 11 which support end disks 13, 13 which carry the multiple parallel tubes 14. The tubes 14 extend slightly beyond the oppositely disposed faces of the disks 13. At the head end of the jacket a manifold header 15 has a flange 16 provided with bolt openings aligned with corresponding openings in the disk 13 and flange 11 to receive a series of bolts 17 to mutually support both the disk and manifold from the jacket flange 11. The tail end of the jacket is provided with a disk 18 which supports a series of elbowed tubes 21 in registery with the ends of tubes 14 within the jacket.

The ends of elbow tubes 21 are counter-sunk in the disk 18 so that when disks 18 and 13 are assembled on the flange 11 the ends of the respective straight and elbow tubes will be in substantial abutting contact. An annular series of bolts 17 passes through registering openings in the disks 13, 18 and flange 11, as at the head end of the jacket.

As in my co-pending application aforesaid, the elbowed tubes 21 provide for transfer of liquid from one series of straight jacketed tubes to another series of straight jacketed tubes in an adjoining jacket without change of cross section of tubes and with uniform velocity throughout. The only change in cross section is in the manifold header 15 where the cross section is abruptly enlarged so that foreign matter will drop out of the stream of flowing liquid for collection in the header. Thus such foreign matter as may be present in the system will accumulate in the manifold for removal at periodic intervals. As the manifold constitutes the only change in cross section of fluid flow it is the only spot in the system at which stagnation can occur. Periodic inspection and sterilization of the easily accessible manifold, however, keeps the entire system free of contamination.

Figure 1:
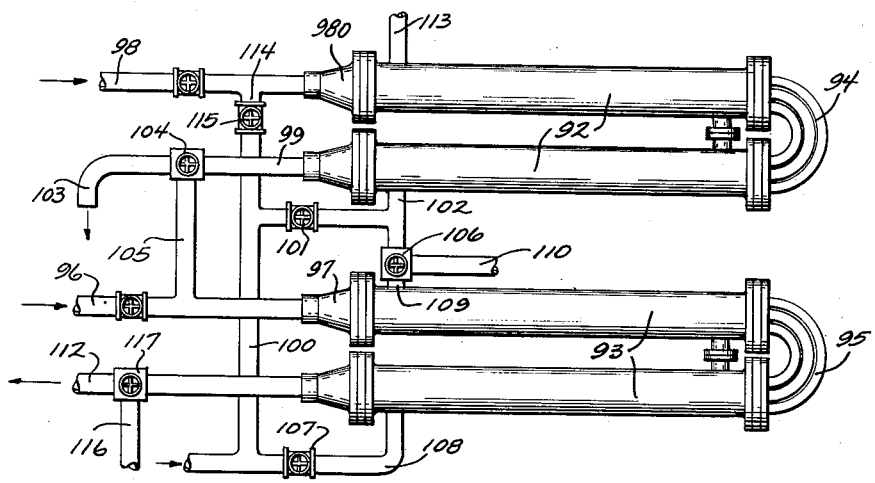
Fig. 1 is a diagrammatic view in side elevation showing the connections of my improved heat exchanger for special use in distillery practice.

The jacket 10 is provided with inlet and outlet connections 22 and 23 near its opposite ends. When the jackets are connected in a heat exchanger system as shown in Fig. 1 the inlet and outlet connections are staggered as illustrated to insure complete circulation of cooling liquids through the jackets. In this device high heat exchange efficiency is maintained because of the high velocity of flow which may be maintained through the tubes without stoppage. Moreover, as the cooling liquid in the jackets is desirably forced in a direction counter to the direction of flow of liquid in the tubes, increased efficiency of heat transfer is achieved.

Fig. 1 diagrammatically illustrates a specialized application of a heat exchanger embodying this invention to distillery practice. Although the heat exchanger is greatly simplified in the diagrammatic showing, it will be understood to incorporate the continuous multi-tube flow described in my companion application aforesaid to promote a high coefficient of heat transfer. In distillery practice, the heat exchanger is used primarily for cooling the mash and, incidentally, for mixing the proper amount of slop with mash to get an approximate 80–20 mixture (eighty percent mash, twenty percent slop). The disclosure exemplifies how the efficient heat transfer achieved by reason of multi-tube flow is used for cooling just as effectively as for heating, and it works with highly viscous semi-liquids, such as mash.

In distillery practice, the required cooling of a given quantity of slop has been accomplished in one and one-half hours through the use of this heat exchanger at 25–40 pounds' pumping pressure, as compared with four and one-half hours required for the cooling of the same amount of material at 120–150 pounds' pumping pressure according to previously existing practices. The reduction in the required cooling period is accomplished with only fifty percent of the volume of cooling water at forty percent of the previous flow rate. At the same time, the yield of alcohol from grain was increased because of the cooling efficiency and because the disclosed arrangement is more readily maintained sterile, and pockets wherein secondary fermentation has previously occurred are eliminated through the use of this apparatus.

There are many other advantages such as the provision of a supply of "topping off water" to complete the volume fill of the fermentation tanks; the facility of steam sterilization; and the adaptability for positive mechanical controls.

In such a distillery installation, the jackets 92 and 93 are typical of any desired number of heat exchange sections, the tubes 94 and 95 being in continuous connection through the respective jackets in multi-tube or parallel arrangement as already described. The incoming mash is supplied through a pipe 96 and subdivided at a header connection 97 to enter the tubes of jackets 93. The mash may have, for example, a temperature of 146° F. The incoming slop is supplied through pipe 98 connected by header 980 to the parallel tubes of jackets 92.

It is common practice to inoculate the incoming mash with approximately twenty percent by volume of slop, but the slop must first be reduced to an appropriate temperature. By way of example, the slop may be assumed to enter through pipe 98 at 190° F. and to leave the multiple tubes 94 of jackets 92 through pipe 99 at a temperature of 110° F., having been cooled by water supplied through pipe 100, valve 101, and pipe 102 at an assumed temperature of 60°.

The unneeded slop is discharged to waste through pipe 103, and the valve 104 is used to regulate the admission to the mash line 96 of the desired proportion of inoculating slop through the cross connection 105. If somewhat less cooling of the slop is desired prior to inoculation, water at a temperature of approximately 100° may be supplied through pipe 102 to the jackets 92, by closing valve 101 and adjusting valve 106 to use water which has already passed through jackets 93. The cooling water for jackets 93 is taken from pipe 100 subject to the control of valve 107 through pipe 108, and it issues from the serially connected jackets 93 through pipe 109 to valve 106, whereby it may be passed to the drain pipe 110 or to pipe 102, as is desired.

The mash entering at the assumed temperature of 146° F. through pipe 96 is somewhat reduced in temperature by dilution with 110° F. slop as above described. In passing through the multi-tubes 95 of jackets 93, it is further cooled by the water of such jackets and leaves the heat exchanger through pipe 112 at a temperature of 66° F. enroute to the fermenters.

Cooling water used in the heat exchanger passes to the drain or to points of further use through pipe 110, above described, or through pipe 113, which is the discharge pipe from serially connected jackets 92.

Where it is desired to flush the multiple tubes of the heat exchanger parts with cold water, this may be done through the cross connection provided at 114 from the water supply line 100 to the slop inlet line 98, the cross connection being controlled by valve 115. The flushing water will be discharged either at 103 or 116, according to the setting of valves 104 and 117 respectively.

It will be understood that the foregoing is merely illustrative of a practical application of the invention to distillery usage, and that among the many other installations for which this type of heat exchanger is adapted are textile mills, breweries, and the like.

It will further be obvious that any desired water and steam connections and thermometers, gauges, rate-of-flow controllers, meters and so forth can be added to the organizations disclosed.

I claim:

1. The combination with a plurality of heat exchangers, each comprising jacket means and multiple tubes extending in parallel therethrough, of means for passing a coolant through said jackets, inlet and outlet connections to the multiple tubes of each exchanger, and a cross connection from the outlet of multiple tubes of one of said heat exchangers to the inlet connection of the multiple tubes of another of said heat exchangers for commingling liquid cooled in the tubes of the said one heat exchanger with a liquid about to be cooled in the tubes of the said other heat exchanger.

2. The device of claim 1 in which the jacket means of the respective heat exchangers are provided with a common coolant supply, and valve means and connections for passing coolant from said supply through said jacket means serially and in parallel according to the setting of said valve means, whereby to control the temperature of liquid cooled in the said one heat exchanger and commingled with liquid about to be cooled in the said other exchanger.

3. The device of claim 1 in which the jacket means of the respective heat exchangers are provided with a coolant supply, the inlet of the tubes of one of said heat exchangers being provided with a cross connection to said coolant supply and valve means in said cross connection.

4. The device of claim 1 in which the outlet connection with which the cross connection communicates comprises a valve and a branch outlet whereby the proportion of liquid commingled can be controlled.

5. A device for inoculating mash with a controllable percentage of slop while simultaneously cooling both the mash and the slop, said device comprising separate heat exchangers comprising jackets and multiple tubes extending in parallel therethrough, means for circulating cooling liquid through said jackets, inlet and outlet connections for the tubes of said heat exchangers, and a first cross connection between the outlet connection of one heat exchanger and the inlet connection of the other heat exchanger, said first cross connection having valve means whereby a controlled percentage of slop cooled in said one heat exchanger may be mixed with the mash about to be cooled in the other heat exchanger.

6. The device of claim 5 in which said first cross connection has a valve controlled waste connection for discharging unneeded slop.

7. The device of claim 5 in which said means for circulating cooling liquid through said jackets comprises inlet and outlet connections to the jackets of each said heat exchanger, a cross connection from the jacket outlet of one heat exchanger to the jacket inlet of another heat exchanger, a common inlet having branch connections to each said heat exchange jacket inlet and valve means in said branch connections and in said cross connection whereby said inlets may be connected in series or in parallel.

8. The device of claim 5 in which the inlet of the multiple tubes in one of said heat exchangers is provided with a second cross connection to said means for circulating cooling liquid through said jackets, and valve means in said second cross connection for flushing cooling liquid through the tubes of said heat exchanger.

9. The device of claim 8 in which the inlet of said other heat exchanger is provided with valve means before said first cross connection whereby cooling liquid flushed through the tubes of the first heat exchanger may be flushed in series through the tubes of the second heat exchanger.

10. The device of claim 5 in which said inlet connections for said tubes comprise manifolds having a greater cross section than the aggregate cross section of said tubes and comprising the only substantial change in cross section of said tubes through said heat exchanger whereby to collect sediment present in said tubes.

References Cited in the file of this patent

UNITED STATES PATENTS

| | | |
|---|---|---|
| 263,087 | Allen et al. | Aug. 22, 1882 |
| 335,267 | Allen et al. | Feb. 2, 1886 |
| 2,490,759 | Tyden | Dec. 6, 1949 |
| 2,520,755 | Brown | Aug. 29, 1950 |